(12) United States Patent
Edwards et al.

(10) Patent No.: US 10,539,021 B2
(45) Date of Patent: Jan. 21, 2020

(54) BALANCING OF AXIAL THRUST FORCES WITHIN A GAS TURBINE ENGINE

(71) Applicant: ROLLS-ROYCE PLC, London (GB)

(72) Inventors: David A Edwards, Derby (GB); Stewart T Thornton, Derby (GB)

(73) Assignee: ROLLS-ROYCE plc, London (GB)

( * ) Notice: Subject to any disclaimer, the term of this patent is extended or adjusted under 35 U.S.C. 154(b) by 427 days.

(21) Appl. No.: 15/399,457

(22) Filed: Jan. 5, 2017

(65) Prior Publication Data

US 2017/0226859 A1 Aug. 10, 2017

(30) Foreign Application Priority Data

Feb. 4, 2016 (GB) .................................. 1602000.0

(51) Int. Cl.
| | |
|---|---|
| *F01D 3/04* | (2006.01) |
| *F04D 29/041* | (2006.01) |
| *F16C 17/04* | (2006.01) |
| *F01D 25/16* | (2006.01) |
| *F16C 17/08* | (2006.01) |

(52) U.S. Cl.
CPC .............. *F01D 3/04* (2013.01); *F01D 25/168* (2013.01); *F04D 29/041* (2013.01); *F04D 29/0413* (2013.01); *F04D 29/0416* (2013.01); *F16C 17/04* (2013.01); *F05D 2260/15* (2013.01); *F16C 17/08* (2013.01)

(58) Field of Classification Search
CPC ........ F01D 3/04; F01D 25/166; F01D 25/168; F04D 29/041; F04D 29/0413; F04D 29/0416; F04D 29/051; F04D 29/0513; F04D 29/0516; F05D 2260/15; F05D 2240/52; F16C 17/04; F16C 17/08
See application file for complete search history.

(56) References Cited

U.S. PATENT DOCUMENTS

| | | | | |
|---|---|---|---|---|
| 2,444,659 | A | * | 7/1948 | Lundquist ................. F01D 3/04 415/105 |
| 3,505,813 | A | * | 4/1970 | McCarthy ................. F01D 3/04 384/611 |
| 3,943,803 | A | | 3/1976 | Hafla |
| 4,492,481 | A | | 1/1985 | Shore |

(Continued)

FOREIGN PATENT DOCUMENTS

| | | | | |
|---|---|---|---|---|
| GB | 826508 | A * | 1/1960 | ............... F01D 3/04 |
| JP | 09170401 | A * | 6/1997 | |

OTHER PUBLICATIONS

Jul. 13, 2016 Search Report issued in British Patent Application No. 1602000.0.

*Primary Examiner* — Brian P Wolcott
(74) *Attorney, Agent, or Firm* — Oliff PLC

(57) ABSTRACT

A thrust balancing mechanism for balancing axial loads on a rotor thrust bearing 3 is described. The mechanism comprises a piston arrangement 6 axially mounted on a stationary structure 2, about a center axis arranged, in use, in coaxial alignment with a rotating shaft 1 carrying the rotor thrust bearing 3. A hydrodynamic thrust bearing 8 is mounted, in use, between the piston 6 and the rotor thrust bearing 3. The piston 6 is pressurized so as to impart to the rotor thrust bearing 3, via the hydrodynamic thrust bearing 8, an axial load which counters an axial load imparted to the rotor thrust bearing 3 by the rotating shaft 1.

13 Claims, 3 Drawing Sheets

(56) References Cited

U.S. PATENT DOCUMENTS

| | | | |
|---|---|---|---|
| 7,559,696 B2 * | 7/2009 | Oncina | F01D 3/04 384/100 |
| 2014/0241887 A1 * | 8/2014 | Neuenschwander | F01D 25/168 416/174 |
| 2018/0320551 A1 * | 11/2018 | Iijima | F01D 3/04 |

* cited by examiner

BALANCING OF AXIAL THRUST FORCES WITHIN A GAS TURBINE ENGINE

TECHNICAL FIELD

The present invention relates to a system for balancing axial loads on a rotor thrust bearing of a rotating shaft, for example a rotor shaft in a gas turbine engine.

BACKGROUND TO THE INVENTION

It is well known that gas turbine engines include a rotor assembly which is rotatable relative to stationary engine structures, including a rotor mounting structure. In the rotor assembly, there are a number of rotatable components, for example; a central shaft, shaft cones, compressor blades and disks, turbine buckets and wheels, and dynamic air seals. These components are each reacted upon by axial pressure forces which may be static or dynamic. The result of a vector sum of these axial pressure forces is a net axial thrust which may by exerted in either of two opposing directions. This net axial thrust places axial loads on the stationary mounting structure. Typically, a rotor thrust bearing is arranged to absorb this load without interfering with the free rotation of the rotor assembly. Commonly this bearing takes the form of a ball bearing, roller bearing or tapered bearing encased within a thrust bearing housing.

During operation of the engine, axial load exerted on the rotor thrust bearing varies as the pressures on the various rotatable components change. Excessive net axial thrust over a prolonged period is a significant cause of wear which can lead to failure of the rotor thrust bearing. As bypass ratios within the turbine increase, axial loads get larger whilst bearing size is reduced. Thus, it becomes problematic to design a bearing of a size which can be accommodated in the turbine and has sufficient capacity to cope with these axial loads. To address this problem, it is known to incorporate into the turbine a thrust balancing mechanism which limits the amount of net axial force imposed on the rotor thrust bearing.

Known thrust balancing mechanisms adopt a range of design principles. For example; increasing internal seal diameters, using higher internal pressures, and adding "spring pack" bearings. Each of these principles is effective in addressing the problem but at a trade-off to other turbine design parameters. Increasing seal diameters increases air system losses and adds weight; using higher internal pressures increases air system losses and "spring pack" bearings add cost and weight.

Known arrangements operate to provide a fixed load to counter net axial thrust, however, since the net axial thrust varies during a flight cycle, these fixed loads can result in unwelcome net loads at times during the engine cycle.

SUMMARY OF THE INVENTION

In accordance with the present invention there is provided a thrust balancing mechanism for balancing axial loads on a rotor thrust bearing, the mechanism comprising at least one piston axially mounted on a stationary structure, about a centre axis arranged, in use, in coaxial alignment with a rotating shaft carrying the rotor thrust bearing, and one or more hydrodynamic thrust bearings mounted, in use, between the piston(s) and the rotor thrust bearing, the piston(s) pressurised so as to impart to the rotor thrust bearing via the hydrodynamic thrust bearing an axial load which counters an axial load imparted to the rotor thrust bearing by the rotating shaft.

In some embodiments, the piston(s) exert axial force via an annular plate arranged, in use, axially between the hydrodynamic thrust bearing and the rotor thrust bearing. The annular plate may be fixedly mounted to the rotating shaft. A lubricant (for example oil) may be provided between the annular plate and an opposing face of the hydrodynamic thrust bearing.

The piston(s) may comprise a single annular piston. Alternatively, multiple pistons may be arranged in an annular configuration around the stationary shaft. Multiple pistons may collectively act on the hydrodynamic thrust bearing. Alternatively, the pistons may act independently, each responsive to a local axial load.

In some embodiments, the piston is hydraulically operated. In such embodiments, the hydraulic fluid may comprise a supply of engine oil. Preferably, such pistons are operably connected to the engine oil feed system. Additionally or alternatively, delivery of hydraulic fluid may be controllable through the inclusion of one or more valves. The valve(s) may be modulating and optionally a controller may be programmed to operate the valves responsive to changes in the axial load on the rotor thrust bearing. Optionally, a control system may be configured to adaptively control valves in response to variations in the axial load on the rotor thrust bearing. In alternative embodiments, the piston may be spring operated or pneumatically controlled.

Optionally, the pistons incorporate a resilient mechanism arranged to withdraw the piston axially away from the rotor thrust bearing when the pressurisation in the piston is reduced or removed. For example, the resilient mechanism may comprise one or more tension springs enclosed within the piston. Conveniently, the resilient mechanism removes axial loading, thus no axial loading is present during engine start up or low power, this reduces wear compared to prior known arrangements thereby improving operational life of the components. Optionally, one or more pivotal engagements is provided between the piston(s) and the hydrodynamic thrust bearing. Such engagements allow a non-axisymmetric axial load to be better balanced.

The hydrodynamic thrust bearings may take the form of any of a number of known arrangements. In some embodiments, the hydrodynamic thrust bearings comprise two radially aligned mating rings, a first fixedly mounted to the stationary structure and a second axially slidable relative to the first. One of the mating rings is optionally radially segmented. The segments are optionally profiled on a surface facing the mating ring and/or tilted with respect to the co-axis. Preferably the first mating ring is radially segmented and/or profiled and/or tilted.

One useful application of the invention is between rotors and static structures in a gas turbine engine, the rotor thrust bearing being arranged on the rotor shaft. The invention is particularly applicable to the interface between the rotor of low pressure turbine (LPT) and the adjacent casing structure.

A benefit of the invention is that it reduces the load on the rotor thrust bearings which allows the possibility to use smaller bearings and save weight within the engine, and/or a means to extend the life of the rotor thrust bearings.

BRIEF DESCRIPTION OF DRAWINGS

An embodiment of the invention will now be described with reference to the accompanying Figures in which.

DETAILED DESCRIPTION OF DRAWINGS AND EMBODIMENTS

Figure 1:
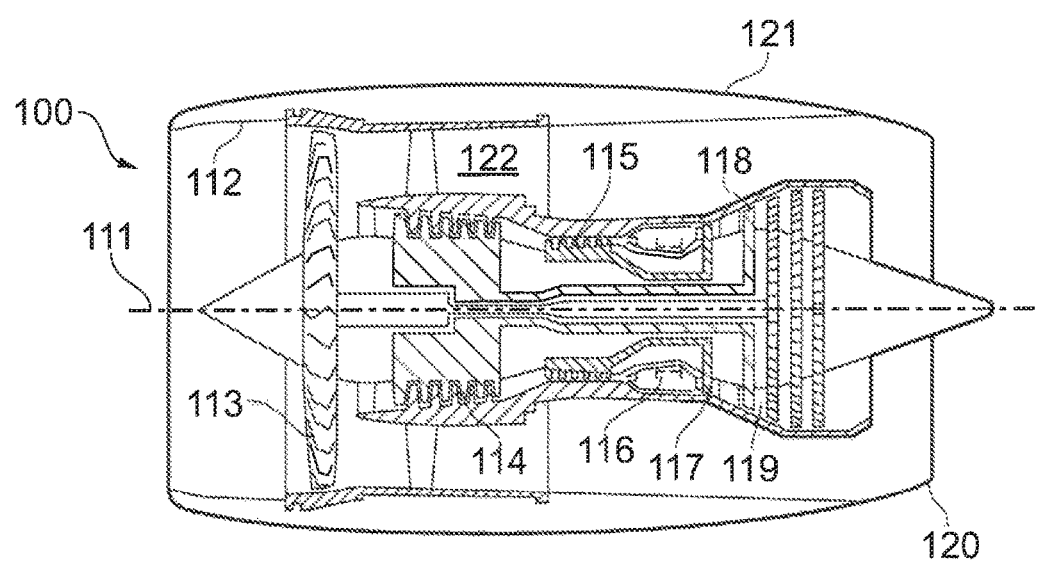
FIG. 1 is a sectional side view of a gas turbine engine known in the prior art.

With reference to FIG. 1, a gas turbine engine is generally indicated at 100, having a principal and rotational axis 111. The engine 110 comprises, in axial flow series, an air intake 112, a propulsive fan 113, an intermediate pressure compressor 114, a high-pressure compressor 115, combustion equipment 116, a high-pressure turbine 117, an intermediate pressure turbine 18, a low-pressure turbine 119 and an exhaust nozzle 120. A nacelle 121 generally surrounds the engine 110 and defines both the intake 112 and the exhaust nozzle 120.

The gas turbine engine 110 works in the conventional manner so that air entering the intake 112 is accelerated by the fan 113 to produce two air flows: a first air flow into the intermediate pressure compressor 114 and a second air flow which passes through a bypass duct 122 to provide propulsive thrust. The intermediate pressure compressor 114 compresses the air flow directed into it before delivering that air to the high pressure compressor 115 where further compression takes place.

The compressed air exhausted from the high-pressure compressor 115 is directed into the combustion equipment 116 where it is mixed with fuel and the mixture combusted. The resultant hot combustion products then expand through, and thereby drive the high, intermediate and low-pressure turbines 117, 118, 119 before being exhausted through the nozzle 120 to provide additional propulsive thrust. The high 117, intermediate 118 and low 119 pressure turbines drive respectively the high pressure compressor 115, intermediate pressure compressor 114 and fan 113, each by suitable interconnecting shaft. The shafts must be mounted within a surrounding, stationary casing. As discussed above each shaft (and other rotating components) is reacted upon by axial pressure forces which may be static or dynamic. A thrust balancing mechanism in accordance with the invention can be fixed to a casing at an end of a rotating shaft driven by the a turbine 117, 118, 119 to balance axial loads on a rotor thrust bearing (not shown) used to mount the shafts for free rotation within the casing.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
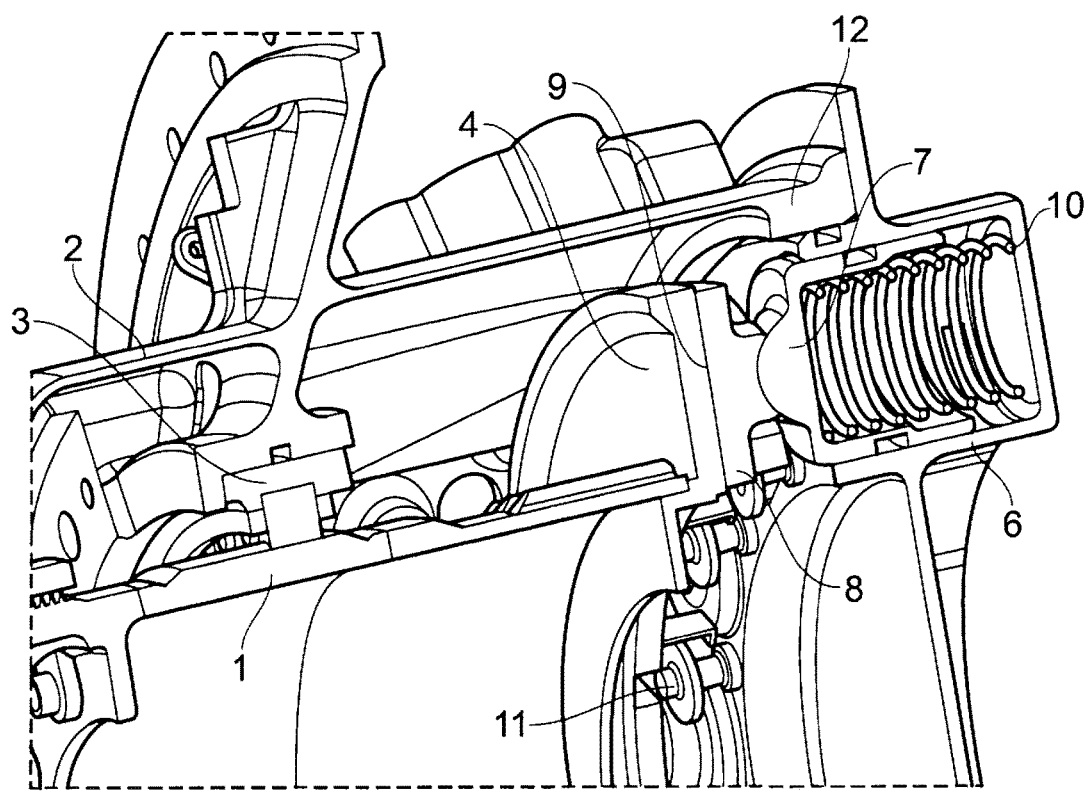
FIG. 2 is sectional perspective view of rotor to stator shaft interface of a gas turbine engine incorporating an embodiment of a thrust balancing mechanism in accordance with the invention.

As can be seen in FIG. 2, a rotor shaft 1 is mounted within a stationary casing 2 by means of a rotor thrust bearing 3 which leaves the rotor shaft 1 free to rotate within the stationary casing 2. The rotor shaft 1 terminates at one end with an annular plate 4 fixedly mounted to the end and facing axially. At an axial end of the casing 2 is provided an annular piston arrangement 6. The annular piston arrangement 6 has a centre axis which is arranged co-axially with rotor shaft 1. A plunger 7 of the piston arrangement 6 engages with a hydrodynamic thrust bearing 8 which has an axially facing surface 9 which faces an axially facing surface of the annular plate 4. It will be appreciated that engaging surfaces of the hydrodynamic thrust bearing 8 and plunger 7 are shaped so as to provide a pivotal engagement. This pivotal engagement accommodates non-axisymmetric axial loading on the axially facing surface 9 of the hydrodynamic thrust bearing 8. A static portion of the bearing is fixedly mounted to the casing 2 by means of mount 12. The portion of the hydrodynamic thrust bearing 8 carrying the face 9 is axially slidable relative to the mount 12.

The piston 6 is operably connected to the engine oil supply. Oil pressure in the engine will tend to vary with load on the rotor thrust bearing (higher pressure and higher bearing load at high engine power conditions), thus, when axial loads on the rotor thrust bearing 3 elevate, so does oil pressure within the piston 6. The piston plunger 7 is consequently forced against the hydrodynamic thrust bearing 8 which transfers an axial load to the annular plate 4. This axial load, which is oppositely directed to axial loading on the rotor thrust bearing 3, is transmitted through the rotor shaft 1 balancing the opposing axial loads. When engine power is reduced, both the axial loading on the rotor thrust bearing 3 and the oil pressure within the hydraulic piston 6 will be reduced and hence the opposing axial load imparted to the rotor shaft via the hydrodynamic bearing 8 and annular plate 4 is also reduced.

The embodiment shown includes an optional tension spring 10 arranged within the piston 6. As the plunger 7 is forced towards the annular plate 4 by increased oil pressure, the spring 10 is brought into tension. As pressure of the oil drops, the axial load is reduced and the spring 10 retracts withdrawing the plunger 7 back into the piston.

Oil feed jets 11 are arranged radially inwardly of the hydrodynamic thrust bearing 8 to supply a film of oil between the front surface 9 of the hydrodynamic thrust bearing 8 and the annular plate 4 to lubricate the interface. The oil jets 11 also serve to cool the components at the interface.

Figure 3:
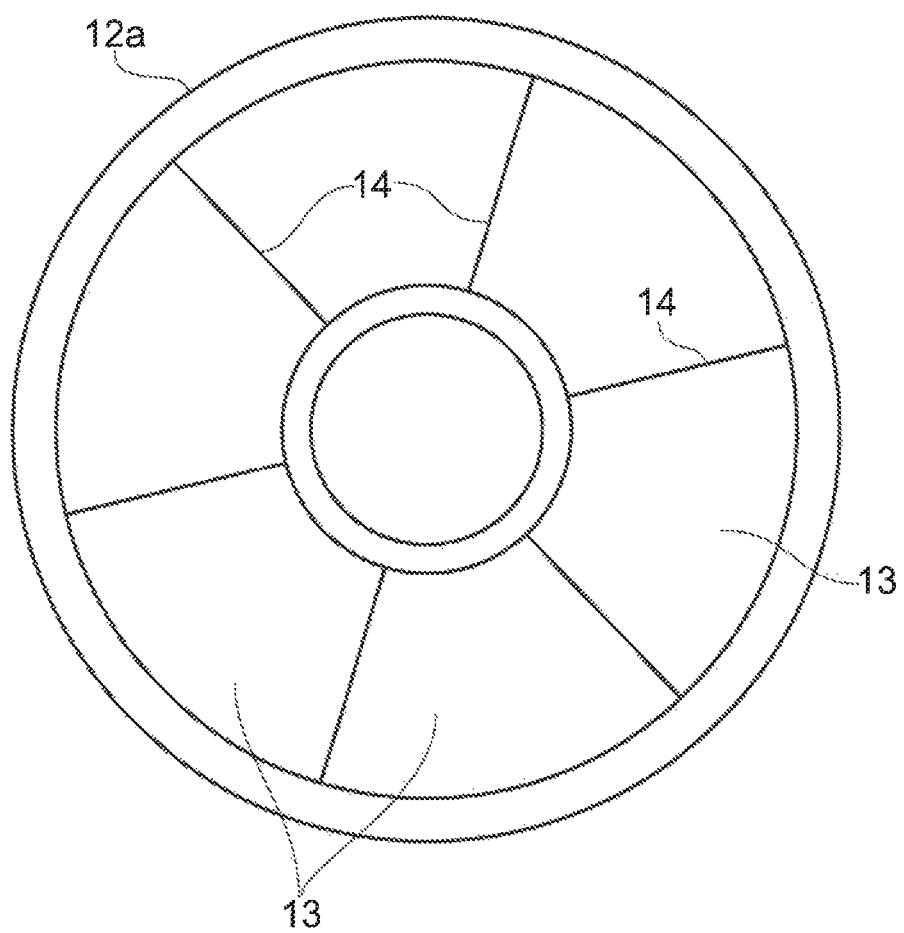
FIG. 3 shows in schematic an end view of hydrodynamic thrust bearing suited for use in embodiments of the invention.

FIG. 3 shows schematically the front face 9 of one example of a hydrodynamic thrust bearing 8 suited to incorporation in embodiments of the invention. As can be seen the bearing 8 comprises a ring 12a which is coupled to the mount 12 of the casing 2. The front face 9 is annular and composed of a plurality of radial segments 13 separated by small radial gaps 14. The segments 13 are optionally configured to tilt in one or more dimensions. Oil may accumulate within the radial gaps 14 to aid lubrication of the interface between the face 9 and annular plate 4. The front face is arranged to be axially slidable relative to the 12a. The segments may be profiled on the face 9 to encourage collection of oil and reduced friction between face 9 and annular plate 4.

It will be understood that the invention is not limited to the embodiments above-described and various modifications and improvements can be made without departing from the scope of the invention as defined by the appended claims. Except where mutually exclusive, any of the features may be employed separately or in combination with any other features and the disclosure extends to and includes all combinations and sub-combinations of one or more features described herein.

The invention claimed is:

1. A thrust balancing mechanism for balancing axial loads on a rotor thrust bearing, the mechanism comprising:

at least one piston axially mounted on a stationary structure, about a center axis arranged, in use, in coaxial alignment with a rotating shaft carrying the rotor thrust bearing;

one or more hydrodynamic thrust bearings mounted, in use, between the at least one piston and the rotor thrust bearing, the at least one piston pressurized so as to impart to the rotor thrust bearing via the one or more hydrodynamic thrust bearings an axial load which counters an axial load imparted to the rotor thrust bearing by the rotating shaft; and an annular plate arranged, in use, axially between the one or more hydrodynamic thrust bearings and the rotor thrust bearing arranged such that the at least one piston transmits an axial load via the one or more hydrodynamic thrust bearings to the annular plate which is fixedly mounted to the rotating shaft, the one or more hydrodynamic thrust bearings each having an axially facing surface that faces an axially facing surface of the annular plate.

2. A thrust balancing mechanism as claimed in claim 1 wherein the at least one piston comprises a single annular piston.

3. A thrust balancing mechanism as claimed in claim 1 wherein the at least one piston comprises multiple pistons arranged in an annular configuration.

4. A thrust balancing mechanism as claimed in claim 3 wherein the multiple pistons are operable independently of each other to balance a localized axial load.

5. A thrust balancing mechanism as claimed in claim 1 wherein the at least one piston is hydraulically operated.

6. A thrust balancing mechanism as claimed in claim 5 further comprising one or more valves operable to control flow of hydraulic fluid to the at least one piston.

7. A thrust balancing mechanism as claimed in claim 6 wherein the hydraulic fluid comprises engine oil and the at least one piston is operably connected to an engine oil feed system whereby to increase axial load on the rotor thrust bearing when engine oil pressure increases.

8. A thrust balancing mechanism as claimed in claim 6 including the one or more valves are modulating.

9. A thrust balancing mechanism as claimed in claim 1 wherein the at least one piston incorporates a resilient mechanism arranged to withdraw the at least one piston axially away from the rotor thrust bearing when the pressurization in the at least one piston is reduced or removed.

10. A thrust balancing mechanism as claimed in claim 9 wherein the resilient mechanism comprises a tension spring.

11. A thrust balancing mechanism as claimed in claim 1 further comprising one or more pivotal engagements between the at least one piston and the one or more hydrodynamic thrust bearings.

12. A thrust balancing mechanism as claimed in claim 1 further comprising a controller operable to monitor axial loading on the rotor thrust bearing and to expand the at least one piston in response to detected increases in axial load on the rotor thrust bearing.

13. A gas turbine engine including;

a thrust balancing mechanism having the configuration set forth in claim 1 fixedly mounted in a casing in co-axial alignment with the rotating shaft and arranged to balance axial loads on the rotor thrust bearing during engine operation; and a turbine having the rotating shaft suspended for free radial movement in the casing by means of the rotor thrust bearing.

* * * * *